United States Patent
Novo Diaz

(10) Patent No.: US 12,120,208 B2
(45) Date of Patent: Oct. 15, 2024

(54) COMMUNICATION PROTOCOL DISCOVER METHOD IN CONSTRAINED APPLICATION PROTOCOL (COAP)

(71) Applicant: Telefonaktiebolaget LM Ericsson (publ), Stockholm (SE)

(72) Inventor: Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/255,956

(22) PCT Filed: Jun. 25, 2018

(86) PCT No.: PCT/EP2018/066987
§ 371 (c)(1),
(2) Date: Dec. 23, 2020

(87) PCT Pub. No.: WO2020/001738
PCT Pub. Date: Jan. 2, 2020

(65) Prior Publication Data
US 2021/0274025 A1    Sep. 2, 2021

(51) Int. Cl.
*H04L 69/24* (2022.01)
*H04L 69/18* (2022.01)
*H04L 67/12* (2022.01)
*H04W 4/38* (2018.01)
*H04W 4/70* (2018.01)

(52) U.S. Cl.
CPC .............. *H04L 69/24* (2013.01); *H04L 69/18* (2013.01); *H04L 67/12* (2013.01); *H04W 4/38* (2018.02); *H04W 4/70* (2018.02)

(58) Field of Classification Search
CPC ....... H04L 69/24; H04L 69/26; H04L 69/169; H04L 69/168; H04L 69/18; H04L 69/165; H04L 67/12; H04L 67/16; H04W 4/38; H04W 4/70
See application file for complete search history.

(56) References Cited

U.S. PATENT DOCUMENTS 6,285,659 B1 * 9/2001 Feuerstraeter ........ H04L 1/0002
714/704
6,658,476 B1 * 12/2003 Van ......................... H04L 67/42
709/223

(Continued)

FOREIGN PATENT DOCUMENTS

WO    2016/113593 A1    7/2016

OTHER PUBLICATIONS

Shelby et al. (NPL: RFC7252, Pub. Date Jun. 2014) (Year: 2014).*

(Continued)

*Primary Examiner* — Hitesh Patel
*Assistant Examiner* — Vinh Nguyen
(74) *Attorney, Agent, or Firm* — Rothwell, Figg, Ernst & Manbeck, P.C.

(57) ABSTRACT

Methods for a CoAP server to inform CoAP clients regarding a set of one or more communication protocols supported by the CoAP server. In one aspect, a CoAP client obtains information indicating a set of one or more communication protocols supported by the CoAP server and determines which of the set of one or more communication protocols to use to communicate with the CoAP server.

13 Claims, 14 Drawing Sheets

(56) References Cited

U.S. PATENT DOCUMENTS

| | | | | |
|---|---|---|---|---|
| 6,671,367 | B1* | 12/2003 | Graf | H04Q 3/0025 370/385 |
| 8,195,864 | B2* | 6/2012 | Whitby-Strevens | G06F 13/4027 710/316 |
| 8,291,097 | B2* | 10/2012 | Feingold | H04L 69/18 709/201 |
| 9,462,089 | B1* | 10/2016 | Fallows | H04L 69/14 |
| 10,764,252 | B2* | 9/2020 | Bone | G06F 21/71 |
| 10,924,895 | B2* | 2/2021 | Buckley | H04W 4/14 |
| 2002/0062407 | A1* | 5/2002 | Tateyama | G06F 3/1244 375/E7.025 |
| 2003/0097410 | A1* | 5/2003 | Atkins | H04L 61/30 709/204 |
| 2005/0071444 | A1* | 3/2005 | Motoyama | H04L 41/0213 709/223 |
| 2006/0026280 | A1* | 2/2006 | Sadovsky | H04L 69/18 709/224 |
| 2006/0123122 | A1* | 6/2006 | Jung | H04L 67/14 709/227 |
| 2006/0271697 | A1* | 11/2006 | Kruse | H04L 69/14 709/230 |
| 2007/0204089 | A1* | 8/2007 | Proctor | H04L 69/18 710/301 |
| 2009/0006538 | A1* | 1/2009 | Risney, Jr. | G06F 8/61 711/216 |
| 2009/0110405 | A1* | 4/2009 | Lee | H04B 10/1143 398/130 |
| 2009/0276663 | A1* | 11/2009 | Kaksonen | G06F 11/263 714/25 |
| 2011/0225238 | A1* | 9/2011 | Shaffer | H04W 4/06 709/227 |
| 2012/0291090 | A1* | 11/2012 | Srinivasan | G06F 21/604 726/4 |
| 2013/0009787 | A1* | 1/2013 | Ree | H04L 67/12 340/870.02 |
| 2013/0097262 | A1* | 4/2013 | Dandison | H04L 67/14 709/206 |
| 2013/0286951 | A1* | 10/2013 | Viswanathan | H04L 69/08 370/328 |
| 2014/0089478 | A1* | 3/2014 | Seed | H04W 4/50 709/222 |
| 2014/0298037 | A1* | 10/2014 | Xiao | H04W 4/70 713/181 |
| 2014/0304498 | A1* | 10/2014 | Gonuguntla | H04L 63/168 713/151 |
| 2014/0349696 | A1* | 11/2014 | Hyde | H04W 24/02 455/517 |
| 2015/0172269 | A1* | 6/2015 | Cha | H04W 12/06 726/5 |
| 2016/0063964 | A1* | 3/2016 | Verma | H04N 21/43637 345/582 |
| 2016/0182463 | A1* | 6/2016 | Suram | H04L 63/205 713/153 |
| 2016/0337216 | A1* | 11/2016 | Kaushik | H04W 4/70 |
| 2016/0344744 | A1* | 11/2016 | Tanoni | H04L 67/02 |
| 2017/0046366 | A1* | 2/2017 | Rahman | G06F 16/24578 |
| 2017/0126817 | A1* | 5/2017 | Poliashenko | H04L 69/18 |
| 2017/0180277 | A1 | 6/2017 | Brady et al. | |
| 2018/0007172 | A1* | 1/2018 | Wang | H04L 67/24 |
| 2018/0109929 | A1* | 4/2018 | Ly | H04W 4/06 |
| 2018/0139309 | A1* | 5/2018 | Pasam | H04W 4/70 |
| 2018/0219976 | A1* | 8/2018 | Decenzo | H04L 65/612 |
| 2019/0014615 | A1* | 1/2019 | Wang | H04L 12/185 |
| 2019/0075149 | A1* | 3/2019 | Lu | H04L 67/42 |
| 2019/0173960 | A1* | 6/2019 | Zhao | H04L 69/18 |
| 2019/0268399 | A1* | 8/2019 | Shelby | H04L 67/025 |
| 2019/0342933 | A1* | 11/2019 | Li | H04W 48/18 |
| 2020/0053417 | A1* | 2/2020 | Choi | H04L 69/18 |
| 2020/0053628 | A1* | 2/2020 | Wang | H04L 67/303 |
| 2020/0092696 | A1* | 3/2020 | Ly | H04L 69/329 |
| 2020/0252259 | A1* | 8/2020 | Ukkola | H04W 4/70 |
| 2021/0211509 | A1* | 7/2021 | Ly | H04L 67/51 |

OTHER PUBLICATIONS

Silverajan et al., CoAP Protocol Negotiation, CoRE Working Group, Mar. 5, 2018. (Year: 2018).*

Silverajan et al., CoAP Protocol Negotiation, CORE Working Group, Oct. 30, 2017 (Year: 2017).*

International Search Report and Written Opinion dated Apr. 17, 2019 in International Application No. PCT/EP2018/066987 (17 pages total).

Shelby, Z., et al., "Core Resource Directory; draft-ietf-core-resource-directory-12.txt," CoRE Internet-Draft Intended status: Standards Track, Geneva, Switzerland, Oct. 30, 2017, No. 12, XP015122852 (64 pages total).

Bormann, C., et al., "CoAP (Constrained Application Protocol) over TCP, TLS, and WebSockets," Internet Engineering Task Force (IETF): Standards Track, RFC 8323, Feb. 2018 (54 pages).

Shelby, Z., et al., "The Constrained Application Protocol (CoAP)," Internet Engineering Task Force (IETF): Standards Track, RFC 7252, Jun. 2014 (112 pages).

* cited by examiner

400

| Communication Protocol | Identifier |
|---|---|
| UDP | 0 |
| UDP + DTLS | 1 |
| TCP | 2 |
| TCP + TLS | 3 |
| WebSockets | 4 |
| WebSockets + TLS | 5 |
| QUIC | 6 |

FIG. 4

COMMUNICATION PROTOCOL DISCOVER METHOD IN CONSTRAINED APPLICATION PROTOCOL (COAP)

CROSS REFERENCE TO RELATED APPLICATION(S)

This application is a 35 U.S.C. § 371 National Stage of International Patent Application No. PCT/EP2018/066987, filed Jun. 25, 2018, designating the United States.

TECHNICAL FIELD

Disclosed are embodiments related to communication protocol discover methods in Constrained Application Protocol (CoAP).

BACKGROUND

The Constrained Application Protocol (CoAP) is a specialized web transfer protocol for use with constrained nodes and constrained (e.g., low-power, lossy) networks. The CoAP is designed for machine-to-machine (M2M) applications such as smart energy and building automation.

The CoAP provides a request/response interaction model between application endpoints, supports built-in discovery of services and resources, and includes key concepts of the Web such as Uniform Resource Identifiers (URIs) and Internet media types. The CoAP is designed to easily interface with Hypertext Transfer Protocol (HTTP) for integration with the Web while meeting specialized requirements such as multicast support, low overhead, and simplicity for constrained environments.

Unlike HTTP, the CoAP messaging model is based on the exchange of messages over User Datagram Protocol (UDP) between endpoints. Some networks, however, do not support UDP packets and complete blocking of UDP packets happens in about 2% to 4% of terrestrial access networks. UDP impairment is especially concentrated in enterprise networks and networks in geographic regions with otherwise challenged connectivity. Some networks also rate-limit UDP traffic and deployment investigations related to the standardization of Quick UDP Internet Connections (QUIC) revealed numbers around 0.3%.

For the above reasons, communication protocols other than UDP have been implemented with CoAP such as Transmission Control Protocol (TCP) or WebSockets. The variety of communication protocols used with CoAP may create interoperability problems between CoAP endpoints supporting different communication protocols. For example, a CoAP client running over UDP cannot communicate with a CoAP server running over TCP.

Current methods of solving such interoperability problems, as specified by various CoAP standards (see, e.g., RFC8323 and RFC7252), include identifying the communication protocol in the URI of every resource. For example a CoAP client discovers a CoAP server and/or associated resources are discovered by obtaining a URI that references a resource in the namespace of the CoAP server.

An exemplary URI identifying a CoAP resource is shown as "coap://www.example.com/temperature." Currently, the following URIs are defined in various URI schemes:

The "coap" URI scheme for CoAP over UDP;
The "coaps" URI scheme for CoAP over UDP secured by DTLS;
The "coap+tcp" URI scheme for CoAP over TCP;
The "coaps+tcp" URI scheme for CoAP over TCP secured by TLS;
The "coap+ws" URI scheme for CoAP over WebSockets; and
The "coaps+ws" URI scheme for CoAP over WebSockets secured by TLS.

Accordingly, a CoAP server shares the URIs of its resources with different CoAP clients. By checking the URI scheme, the CoAP clients are able to determine the communication protocol of each CoAP resource. For example, a CoAP client determines that the CoAP resource URI coap+tcp://www.example.com/getHumidity uses the TCP communication protocol. The CoAP client would then communicate with the CoAP resource using the TCP communication protocol.

REFERENCES

[RFC8323] C. Bormann et. al, "CoAP (Constrained Application Protocol) over TCP, TLS, and WebSockets", RFC 8323, February 2018.

[RFC7252] Z. Shelby et. al, "The Constrained Application Protocol (CoAP)", RFC 7252, June 2014.

SUMMARY

The current methods of addressing the interoperability problems between CoAP endpoints supporting different communication protocols, however, have various problems. First, every time a new communication protocol is specified for CoAP, new URI scheme identifiers need to be defined. Out-of-date CoAP clients may not be able to parse the new URIs and communicate to it. Second, a URI identifier is currently linked to its communication protocol. In proper design architecture, however, the URI identifier should be defined independently from the communication protocol. Third, the communication protocol of a resource might change during time. As such, the URI for the transport must also be changed accordingly. Fourth, even if it is possible to access a CoAP resource through different communication protocols, a CoAP resource currently has to have different URIs for each communication protocol that deploys over CoAP. Fifth, the CoAP server cannot inform the CoAP client about the communication protocols that it supports.

Accordingly, to overcome at least some of the deficiencies of the prior art, there are provided methods for a CoAP server to expose the communication protocols it supports to CoAP clients. The proposed methods facilitate the decoupling of the URI identifier of a CoAP resource from a communication protocol. The proposed methods further enable a CoAP client to obtain information indicating the different communication protocols supported by a CoAP server and determine which of the different communication protocols to use to communicate with the CoAP server.

In one aspect, there is provided a method for CoAP servers to inform CoAP clients of various communication protocols supported by the CoAP servers. In some embodiments, a CoAP server directly informs the CoAP clients about its supported communication protocols. In some embodiments, the CoAP server sends information indicating the supported communication protocols to a resource directory. The resource directory is defined in the following standard: draft-ietf-core-resource-directory (hereinafter referred to as "IETF Core Resource Directory"). The proposed methods provide the CoAP protocol with a new CoAP option value and the resource directory with a new parameter according to some embodiments.

In another aspect, there is provided a method performed by a client node. In one embodiment, the method includes the client node transmitting a first request. The method includes the client node receiving a response to the first request. In some embodiments, the response to the first request comprises information indicating a set of communication protocols supported by a server. The method includes the client node identifying the set of communication protocols from the received information. The method includes the client node selecting a communication protocol from the identified set of communication protocols. The method includes the client node using the selected protocol to transmit a second request to the server. The method includes the client node receiving a response transmitted by the server in response to the second request.

In some embodiments, the step of transmitting the first request comprises transmitting the first request to a resource directory node. In such embodiments, the first request comprises a resource identifier, the response to the first request further comprises a resource locator associated with the resource identifier, and the resource locator comprises a server identifier (e.g. IP address or host name) identifying the server.

In some embodiments, the step of transmitting the first request comprises transmitting the first request to the server. In such embodiments, the first request is a CoAP request message comprising a target resource identifier identifying a target resource, and the response to the first request is a CoAP response message comprising a header and a payload. In some embodiments, the information indicating the set of communication protocols supported by the server is contained within the payload of the CoAP response message. In some embodiments, the information indicating the set of communication protocols supported by the server is contained within the header of the CoAP response message. In some embodiments, the payload of the CoAP response message further comprises a representation of the target resource.

In some embodiments, the information indicating the set of communication protocols comprises a list of one or more communication protocols supported by the server in order of preference.

In another aspect, there is provided a method performed by a server node. In one embodiment, the method includes the server node receiving a first request transmitted by a client node, the first request comprising a target resource identifier identifying a target resource and requesting a representation of the identified target resource. The method includes the server node transmitting to the client node a response to the first request, the response comprising a representation of the identified target resource and information indicating a set of communication protocols supported by the server node.

In some embodiments, the method includes the server node receiving a second request transmitted by the client node using a communication protocol selected from the set of communication protocols supported by the server node, the second request comprising the target resource identifier identifying the target resource and requesting the representation of the identified target resource.

In another aspect, there is provided a method performed by a resource directory node. In one embodiment, the method includes the resource directory node receiving a resource registration request transmitted by a server node, the resource registration request comprising a resource identifier, a resource locator associated with the resource identifier, and information indicating a set of communication protocols supported by the server node. The method includes the resource directory node storing the resource identifier, the resource locator associated with the resource identifier, and the information indicating the set of communication protocols. The method includes the resource directory node receiving a resource locator request transmitted by a client node, the resource locator request comprising the resource identifier and requesting the resource locator associated with the resource identifier. The method includes the resource directory node transmitting to the client node, in response to receiving the resource locator request, a response comprising the resource locator associated with the resource identifier, and the information indicating the set of communication protocols supported by the server node having that resource.

In another aspect, there is provided a method performed by a server node. In one embodiment, the method includes the server node transmitting a resource registration to a resource directory node, the resource registration request comprising a resource identifier, a resource locator associated with the resource identifier, and information indicating a set of communication protocols supported by the server node. The method includes the server node receiving a request transmitted by a client node using a communication protocol selected from the set of communication protocols supported by the server node, wherein the request is a CoAP request message comprising a target resource identifier identifying a target resource.

Some advantages to the overall Internet of Things (IOT) CoAP scenario provided by the embodiments disclosed herein include, but are not limited to, the following:

(1) CoAP clients may obtain information indicating the different communication protocols that a CoAP server can support.

(2) CoAP clients may choose the most suitable communication protocol for each application running on top of CoAP, thereby improving the efficiency and the interoperability of the applications. For example, a CoAP client may choose a communication protocol such as TCP for some applications such as an alarm sensor which requires reliability, while choosing a different communication protocol such as UDP for other applications which do not require reliability such as a surveillance camera sensor sending video over the network.

(3) CoAP clients may determine the communication protocol for each CoAP communication according to the requirements of each application. That is, the CoAP clients may customize each CoAP communication, thereby reducing CPU, memory, and energy consumption. Accordingly, the CoAP servers may also save energy due to the customized CoAP communication.

BRIEF DESCRIPTION OF THE DRAWINGS

The accompanying drawings, which are incorporated herein and form part of the specification, illustrate various embodiments.

FIG. 4 shows a table according to one embodiment.

DETAILED DESCRIPTION

Figure 1:
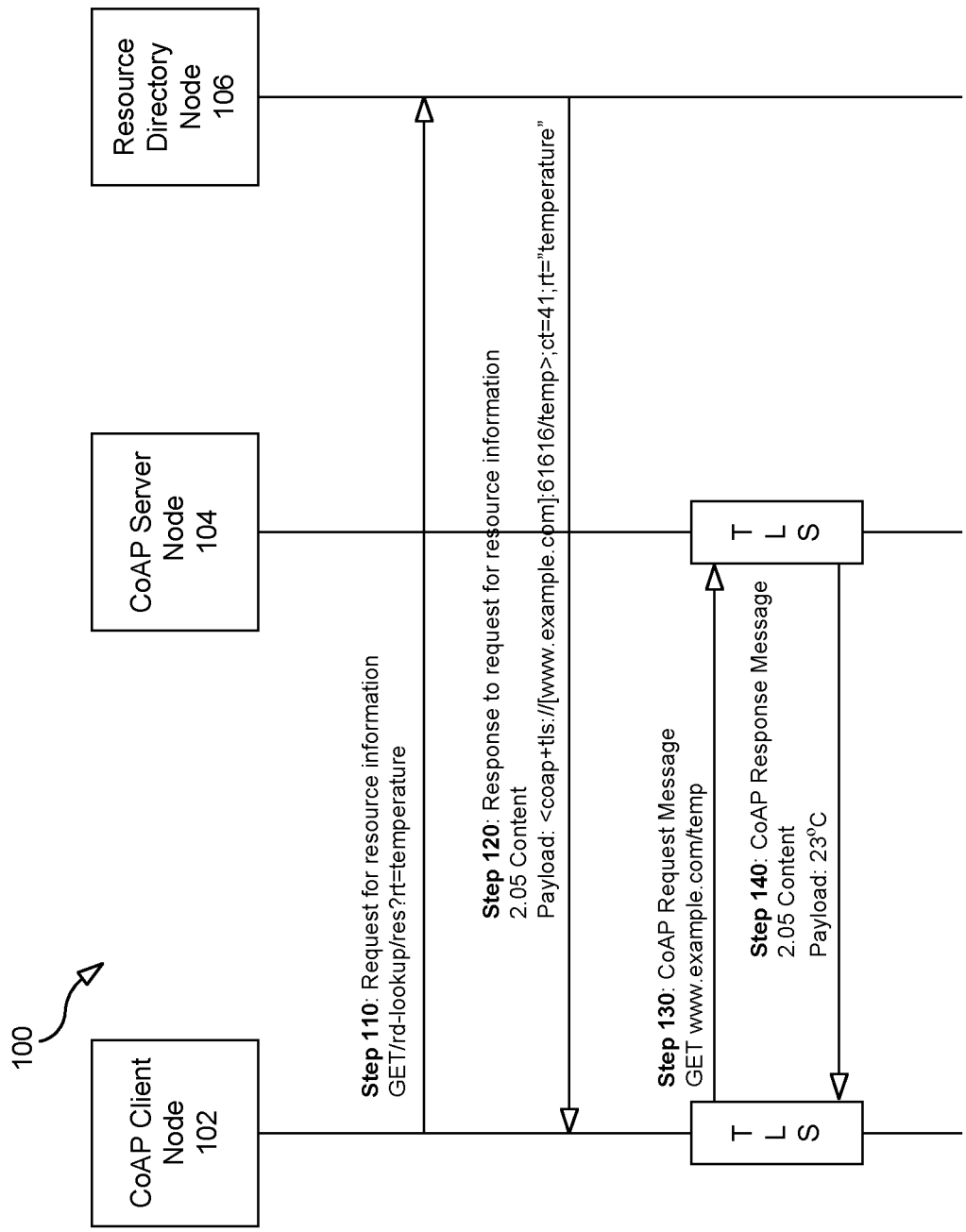
FIG. 1 is a flow chart illustrating a process.

FIG. 1 is a flow diagram illustrating a conventional process 100 according to various CoAP standards such as, for instance, RFC8323, RFC7252, and IETF Core Resource Directory.

In step 110, a CoAP client node 102 sends a request for resource information to a resource directory node 106. The request for resource information may comprise a target resource identifier identifying a target resource. The CoAP client node 102 may utilize a GET method to retrieve the resource information as explained in RFC7252. For example, the request for resource information may comprise "GET/rd-lookup/res?rt=temperature," where "rt" indicates the resource type and the "rd-lookup" indicates resource directory lookup. By way of background, draft-ietf-core-resource-directory explains that the GET method retrieves a representation for information that corresponds to the resource identified by the request URI.

In step 120, the resource directory node 106 sends a response to the request for resource information. IETF Core Resource Directory explains that if the request for resource information is valid, a response to the request includes a 2.05 (Content) Response Code, i.e. an OK message. As shown in FIG. 1, the response to the request for resource information includes a 2.05 Content Response Code and a payload. The payload returned in the response may be a representation of a target resource. For example, the payload may be <coap+tls://[www.example.com]:61616/temp>;ct=41; rt="temperature" as shown in FIG. 1. Accordingly, the CoAP client node 102, which knows the identifier of a CoAP resource, identifies the communication protocol to use towards the target resource by parsing the CoAP URI scheme in the received payload. For example, the CoAP client node 102 may determine from the URI scheme whether the communication protocol is one of coap, coaps, or coap+tls, among others. As shown in FIG. 1, the CoAP client node 102 knows that the URI of the CoAP resource is coap+tls://www.example.com/temperature and determines that "coap+tls" is the URI scheme of that particular resource in the CoAP server node 104. In the context of the current disclosure, the resource directory node 106 acts as a database storing the information of the resources of a constrained network. For example, one piece of that information includes the URIs of the resources.

After the CoAP client node 102 identifies the communication protocol of the CoAP resource from the URI of the target resource, the CoAP client node 102 sends a CoAP request message to a CoAP server node 104 using the identified communication protocol as shown in step 130 of FIG. 1. In step 140, the CoAP server node 104 responds to the CoAP request message using the identified communication protocol.

The current standardized method (see, e.g., RFC8323, RFC7252, and IETF Core Resource Directory), however, assumes that each CoAP resource can use only one communication protocol and does not let the CoAP server nodes 104 inform the CoAP client nodes 102 about other supported communication protocols.

Figure 2:
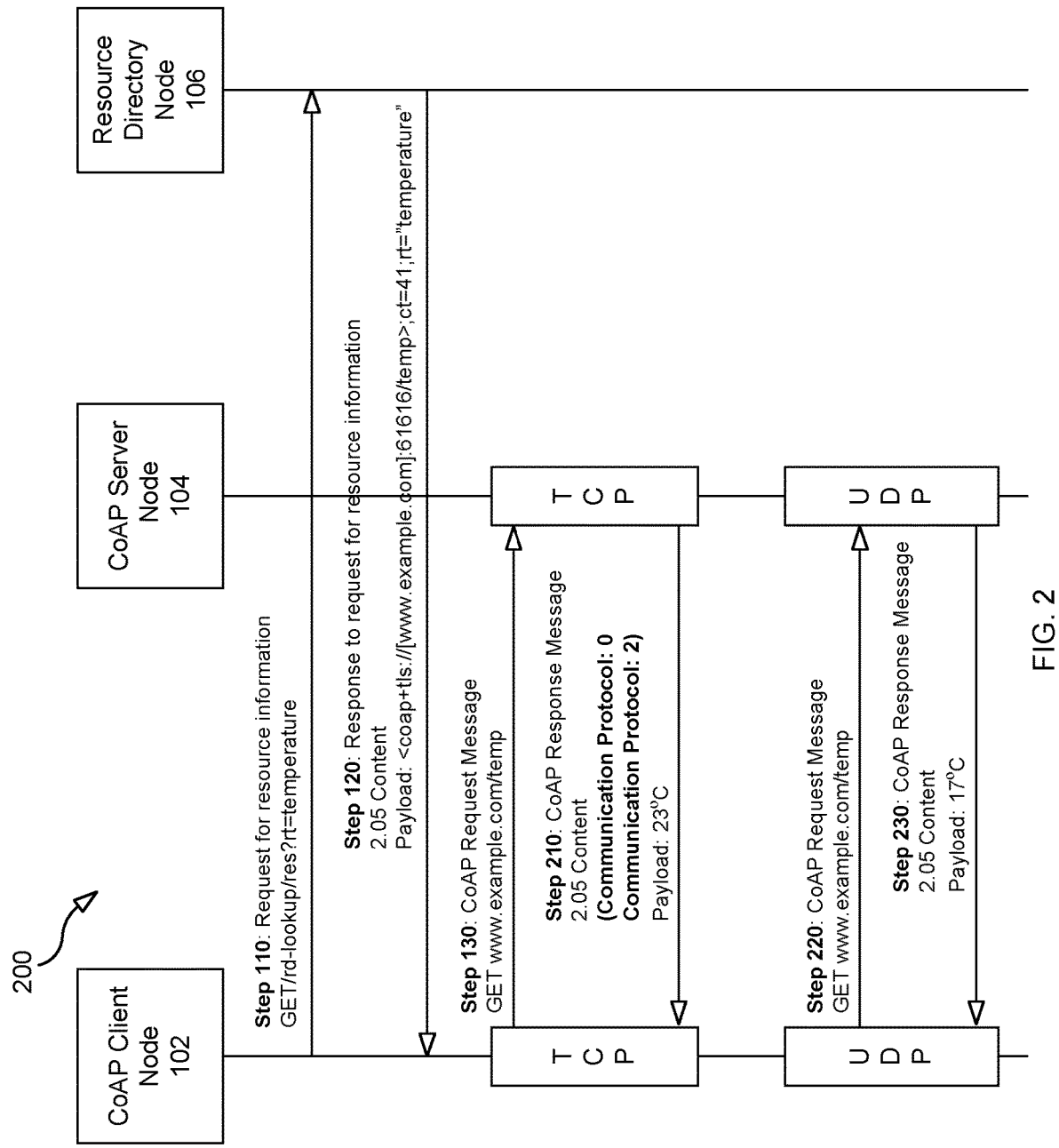
FIG. 2 is a flow chart illustrating a process according to one embodiment.

FIG. 2 is a flow diagram illustrating a process 200 according to some embodiments. Steps 110, 120, and 130 shown in FIG. 2 correspond to steps 110, 120, and 130 of FIG. 1. After step 130, in which the CoAP client node 102 sends the CoAP Request Message using a first communication protocol (e.g., TCP), the CoAP server node 104 advertises different communication protocols supported by the CoAP server node 104 to the CoAP client node 102. That is, in step 210, the CoAP server node 104 sends a CoAP response message comprising information indicating a set of one or more communication protocols supported by the CoAP server node 104. The CoAP response message may comprise a header and a payload. In some embodiments, the information indicating the set of communication protocols supported by the CoAP server node 104 is contained within the payload or the header of the CoAP response message. In some embodiments, the payload may comprise a representation of the target resource.

In some embodiments, the set of one or more communication protocols may be indicated as "(Communication protocol: 0, Communication protocol: 2)" in the CoAP response message as shown in FIG. 2. Accordingly, the proposed method provides a new option value in the CoAP protocol which indicates the communication protocols supported by the CoAP server node 104. Each possible communication protocol may be assigned a numeric value, i.e. the option value. In some embodiments, the option value may be an integer number between 0 and 15 (providing 16 possible values). While FIG. 2 shows the set of one or more communication protocols indicated by "Communication Protocol," any different name can be assigned to the various communication protocols supported by the CoAP server node 104. Table 4 of FIG. 4 lists an exemplary numerical representation of some communication protocols according to some embodiments. More values can be defined using the same option and format in different embodiments. In some embodiments, the one or more supported communication protocols are listed in order of preference in the CoAP response message.

The CoAP client node 102 receives the set of one or more communication protocols supported by the CoAP server node 104 and determines a communication protocol in the set of one or more communication protocols to use for sending a CoAP request message to the CoAP server node 104. In step 220, the CoAP client node 102 sends the CoAP request message to the server node 104 using the determined communication protocol. For example, the CoAP client node 102 may make a determination to change the communication protocol from TCP to an unreliable communication protocol (e.g., UDP) and send the CoAP request message using the determined communication protocol as shown in FIG. 2. In some embodiments, the CoAP request message comprises the target resource identifier identifying the target resource. In step 230, the CoAP server node 104 sends a response using the determined communication protocol (e.g., UDP). In some embodiments, the response comprises a representation of the target resource.

Figure 3:
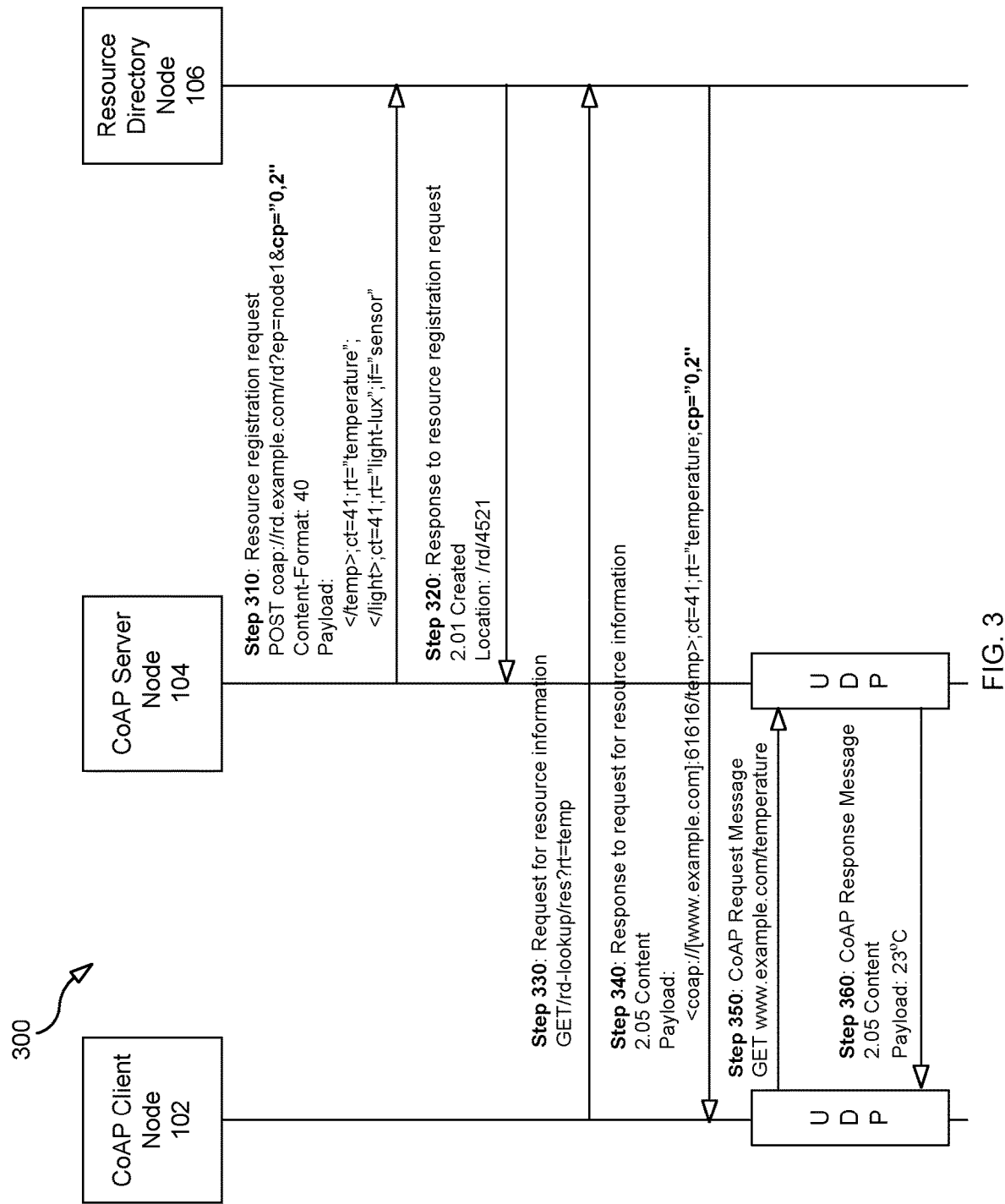
FIG. 3 is a flow chart illustrating a process according to one embodiment.

FIG. 3 is a flow diagram illustrating a process 300 according to some embodiments. As noted above, the resource directory node 106 is a database that may store the information regarding different resources in the constrained network. The information includes the URIs of the different resources.

In step 310, the CoAP server node 104 sends a resource registration request to the resource directory node 106 to register its resources and supported communication protocols. In some embodiments, the resource registration request comprises a resource identifier, a resource locator associated with the resource identifier, and information indicating a set of one or more communication protocols supported by the CoAP server node 104. The information indicating the set of communication protocols comprises a new variable for the registration interface of the resource directory node 106. In some embodiments, the new variable for communication protocol may be indicated as "cp=" and may be an optional variable that CoAP endpoints use to register supported communication protocols. In some embodiments, the different communication protocol values may be described as integers using identifiers defined, for instance, in Table 400 of FIG. 4. If the CoAP server node 104 supports multiple communication protocols, the identifier for each of the multiple communication protocols is separated using a comma. For example, if the CoAP server node 104 supports UDP and TCP over CoAP, the resource registration request transmitted by the CoAP server node 104 in step 310 may comprise the new variable cp="0,2" where 0 indicates UDP and 2 indicates TCP. In some embodiments, the supported communication protocols may be listed in order of preference. Accordingly, in the example of the new variable cp="0,2," UDP is preferred over TCP.

In some embodiments, the CoAP server node 104 may utilize the POST method to register the resource information at the resource directory node 106 as explained in draft-ietf-core-resource-directory. As explained in IETF Core Resource Directory, the actual function performed by the POST method is determined by the origin server and dependent on the target resource and usually results in a new resource being created or the target resource being updated.

In step 320, the resource directory node 106 registers the received resource information and supported communication protocols and sends a response to the CoAP server node 104 indicating that the registration is complete. In some embodiments, the communication protocols are registered in the indicated order of preference. Accordingly, the CoAP client node 102 may now obtain resource information and supported communication protocols for a specific CoAP resource from the resource directory node 106.

In step 330, the CoAP client node 102 sends a request for resource information to the resource directory node 106 for a CoAP resource. In some embodiments, the request for resource information comprises the resource identifier and requests the resource locator associated with the resource identifier.

In step 340, the resource directory node 106 sends a response to the CoAP client node 102 comprising information indicating the set of one or more communication protocols supported for the specific CoAP resource. In some embodiments, the response to the CoAP client node 102 further comprises the resource locator associated with the resource identifier. In some embodiments, the response to the request for resource information comprises a header and a payload. Accordingly, the information indicating the set of one or more communication protocols supported for the specific CoAP resource may be contained within the header. In some embodiments, the information indicating the set of one or more communication protocols supported for the specific CoAP resource comprises the new variable for the registration interface of the resource directory node 106. For example, the response to the request for resource information may comprise the new variable cp="0,2" where 0 indicates UDP and 2 indicates TCP. In some embodiments, the supported communication protocols may be listed in order of preference. Accordingly, in the example of the new variable cp="0,2," UDP is preferred over TCP.

The CoAP client node 102 receives the set of one or more communication protocols supported for the specific CoAP resource and determines a communication protocol from the set of one or more communication protocols. In step 350, the CoAP client node 102 sends the CoAP request message to the server node 104 using the determined communication protocol. For example, the CoAP client node 102 may make a determination to use an unreliable communication protocol (e.g., UDP) and send the CoAP request message using the determined communication protocol as shown in FIG. 3. In some embodiments, the CoAP request message comprises a target resource identifier identifying the specific CoAP resource. In step 360, the CoAP server node 104 sends a response using the determined communication protocol (e.g., UDP). In some embodiments, the response comprises a representation of the specific CoAP resource.

Figure 5:
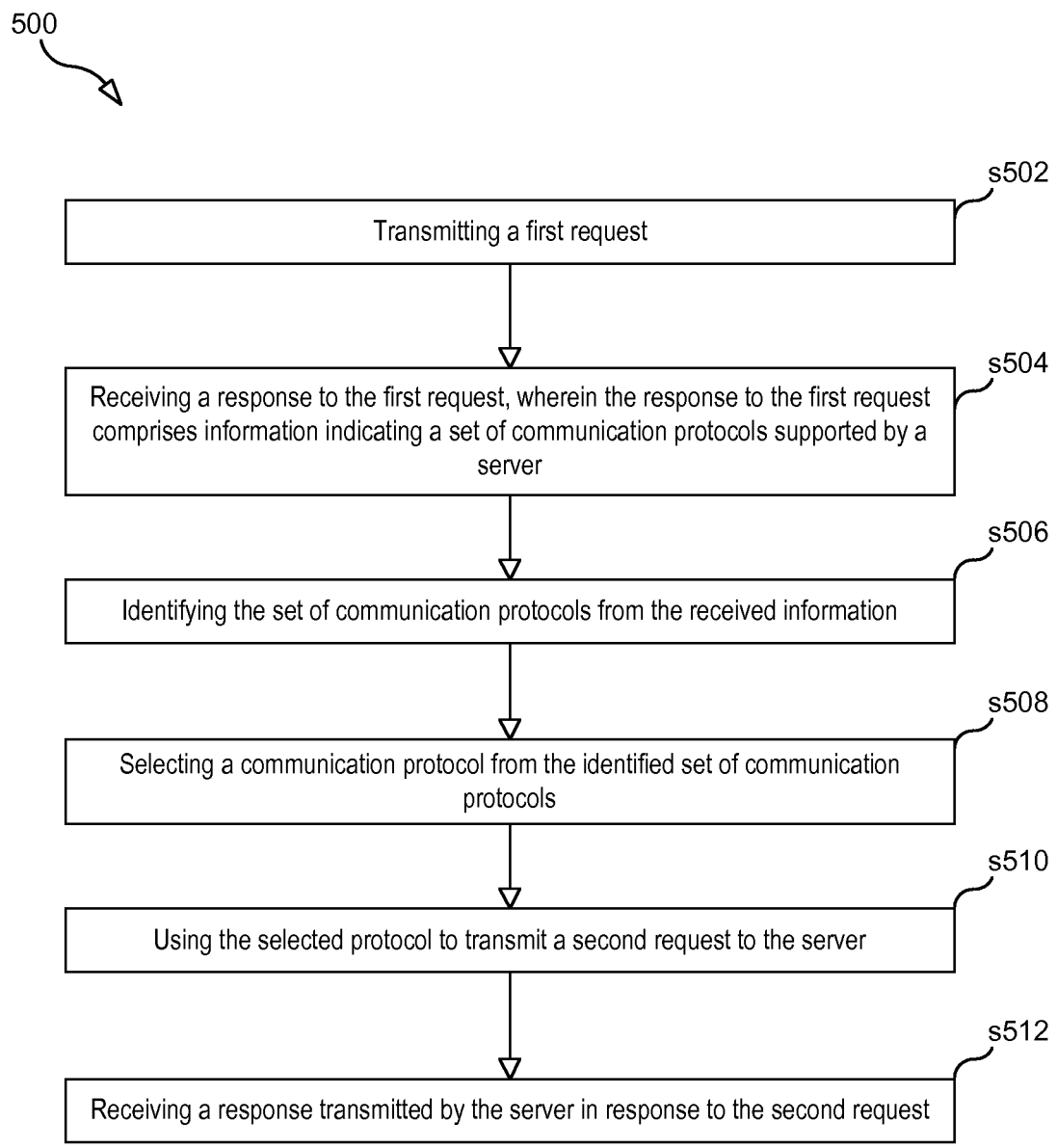
FIG. 5 is a flow chart illustrating a process according to one embodiment.

FIG. 5 is a flow chart illustrating a process 500, according to some embodiments, that is performed by the CoAP client node 102. Process 500 may begin with step s502 in which the CoAP client node 102 transmits a first request. In step s504, the CoAP client node 102 receives a response to the first request. In some embodiments, the response to the first request comprises information indicating a set of communication protocols supported by a server. In step s506, the CoAP client node 102 identifies the set of communication protocols from the received information. In step s508, the CoAP client node 102 selects a communication protocol from the identified set of communication protocols. In step s510, the CoAP client node 102 uses the selected protocol to transmit a second request to the server. In step s512, the CoAP client node 102 receives a response transmitted by the server in response to the second request.

In some embodiments, the step of transmitting the first request comprises transmitting the first request to a resource directory node. In such embodiments, the first request comprises a resource identifier, the response to the first request further comprises a resource locator associated with the resource identifier, and the resource locator comprises a server identifier (e.g. IP address or host name) identifying the server.

In some embodiments, the step of transmitting the first request comprises transmitting the first request to the server. In such embodiments, the first request is a CoAP request message comprising a target resource identifier identifying a target resource, and the response to the first request is a CoAP response message comprising a header and a payload. In some embodiments, the information indicating the set of communication protocols supported by the server is contained within the payload of the CoAP response message. In some embodiments, the information indicating the set of communication protocols supported by the server is contained within the header of the CoAP response message. In some embodiments, the payload of the CoAP response message further comprises a representation of the target resource.

In some embodiments, the information indicating the set of communication protocols comprises a list of one or more communication protocols supported by the server in order of preference.

Figure 6:
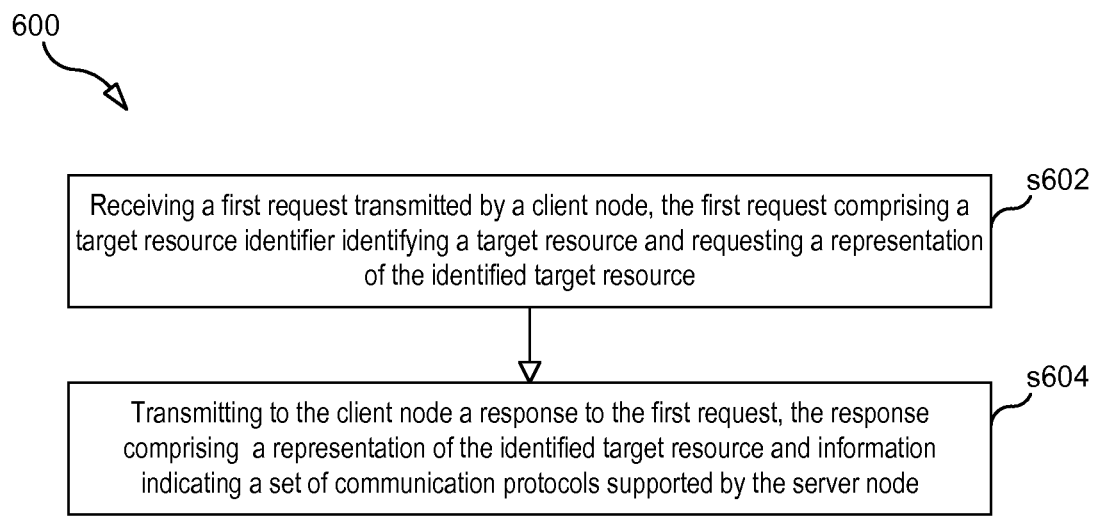
FIG. 6 is a flow chart illustrating a process according to one embodiment.

FIG. 6 is a flow chart illustrating a process 600, according to some embodiments, that is performed by the CoAP server node 104. Process 600 may begin with step s602 in which the CoAP server node 104 receives a first request transmitted by a client node, the first request comprising a target resource identifier identifying a target resource and requesting a representation of the identified target resource. In step s604, the CoAP server node 104 transmits to the client node a response to the first request, the response comprising a representation of the identified target resource and information indicating a set of communication protocols supported by the server node.

In some embodiments, process 600 includes an additional step in which the CoAP server 104 receives a second request transmitted by the client node using a communication protocol selected from the set of communication protocols supported by the server node, the second request comprising the target resource identifier identifying the target resource and requesting the representation of the identified target resource.

Figure 7:
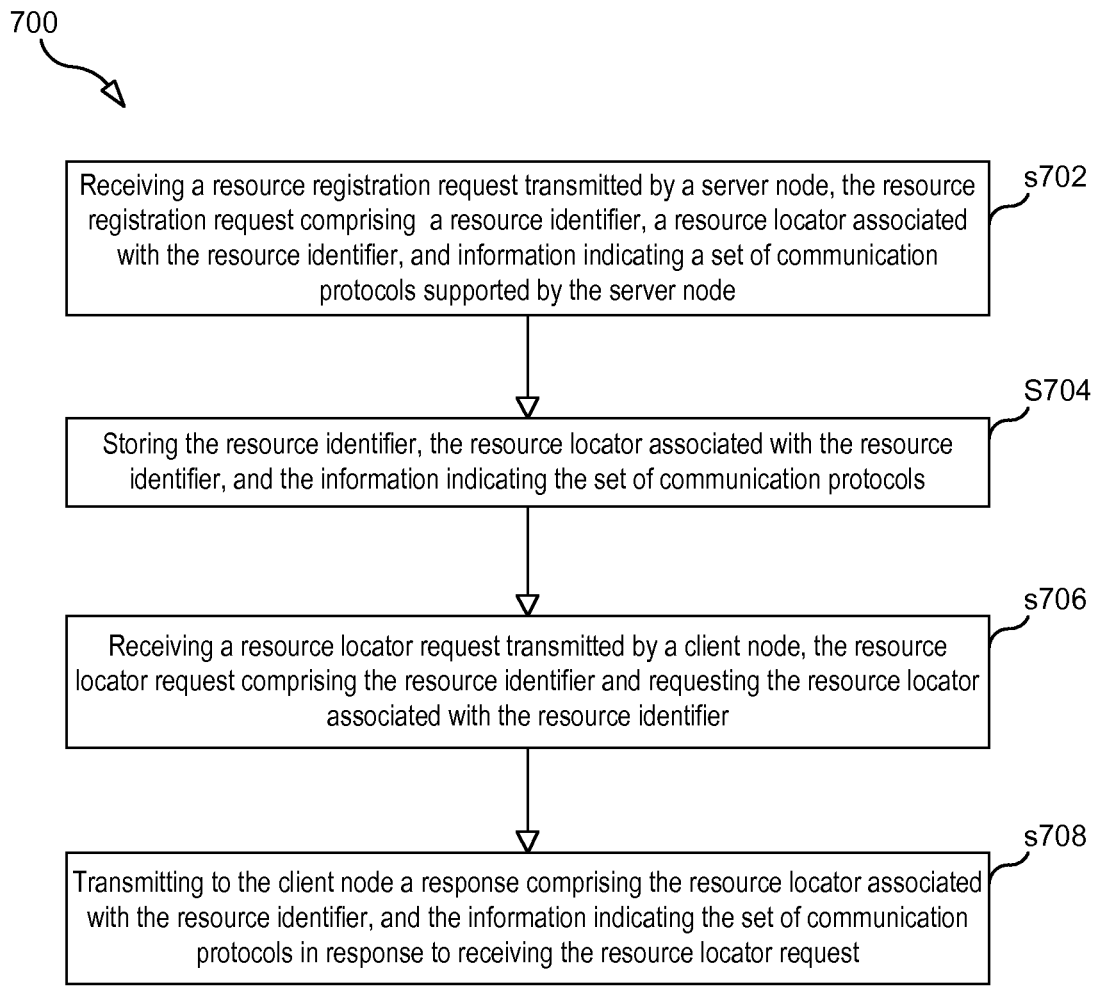
FIG. 7 is a flow chart illustrating a process according to one embodiment.

FIG. 7 is a flow chart illustrating a process 700, according to some embodiments, that is performed by the resource directory node 106. Process 700 may begin with step s702 in which the resource directory node 106 receives a resource registration request transmitted by a server node, the resource registration request comprising a resource identifier, a resource locator associated with the resource identifier, and information indicating a set of communication protocols supported by the server node. In step s704, the resource directory node 106 stores the resource identifier, the resource locator associated with the resource identifier, and the information indicating the set of communication protocols. In step s706, the resource directory node 106 receives a resource locator request transmitted by a client node, the resource locator request comprising the resource identifier and requesting the resource locator associated with the resource identifier. In step s708, the resource directory node 106 transmits to the client node, in response to receiving the resource locator request, a response comprising the resource locator associated with the resource identifier, and the information indicating the set of communication protocols.

Figure 8:
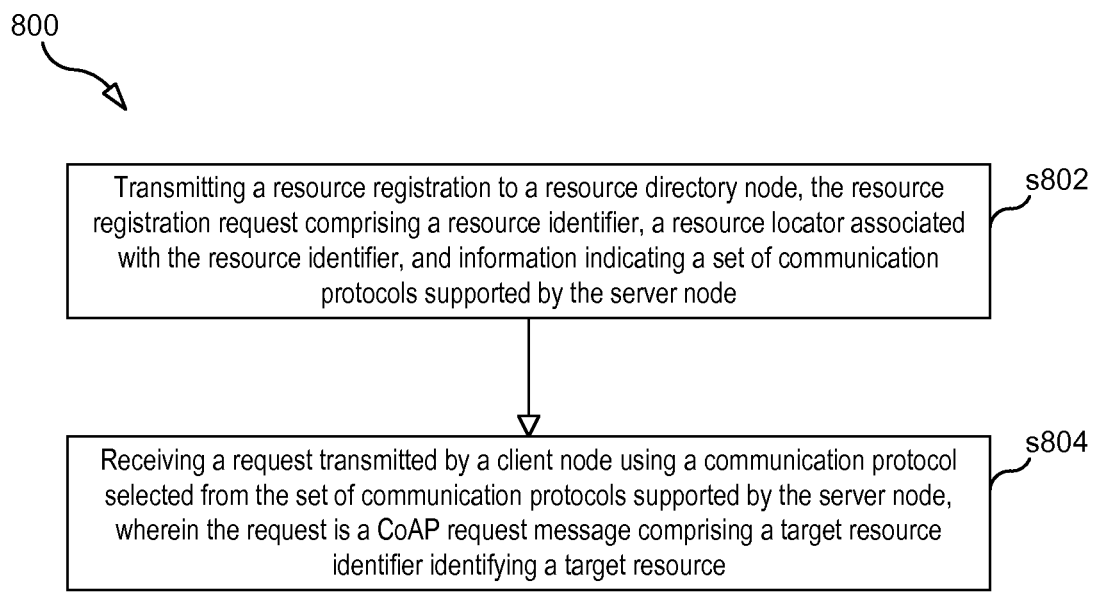
FIG. 8 is a flow chart illustrating a process according to one embodiment.

FIG. 8 is a flow chart illustrating a process 800, according to some embodiments, that is performed by the CoAP server node 104. Process 800 may begin with step s802 in which the CoAP server node 104 transmits a resource registration to a resource directory node, the resource registration request comprising a resource identifier, a resource locator associated with the resource identifier, and information indicating a set of communication protocols supported by the server node. In step s804, the CoAP server node 104 receives a request transmitted by a client node using a communication protocol selected from the set of communication protocols supported by the server node, wherein the request is a CoAP request message comprising a target resource identifier identifying a target resource.

Figure 9:
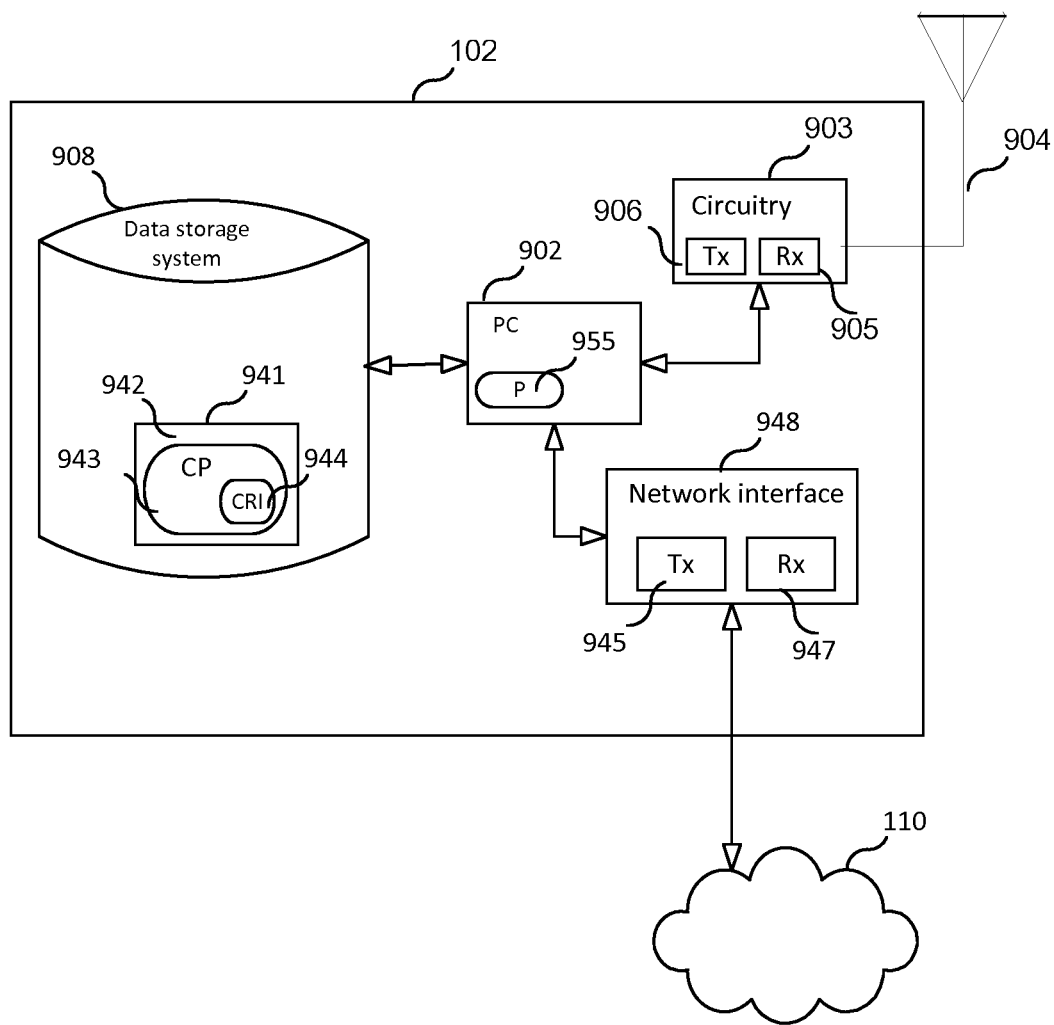
FIG. 9 is a block diagram of a client node according to one embodiment.

FIG. 9 is a block diagram of the client node 102 according to some embodiments. As shown in FIG. 9, the client node 102 may comprise: a processing circuit (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling the client node 102 to transmit data to and receive data from other nodes connected to a network 110 (e.g., an Internet Protocol (IP) network) to which network interface 948 is connected; circuitry 903 (e.g., radio transceiver circuitry comprising an Rx 905 and a Tx 906) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by PC 902, the CRI causes the client node 102 to perform steps described herein (e.g., steps described herein with reference to the flow charts and/or message flow diagrams). In other embodiments, the client node 102 may be configured to perform steps described herein without the need for code. That is, for example, PC 902 may consist merely of one or more ASICs. Hence, the features of the embodiments described herein may be implemented in hardware and/or software.

Figure 10:
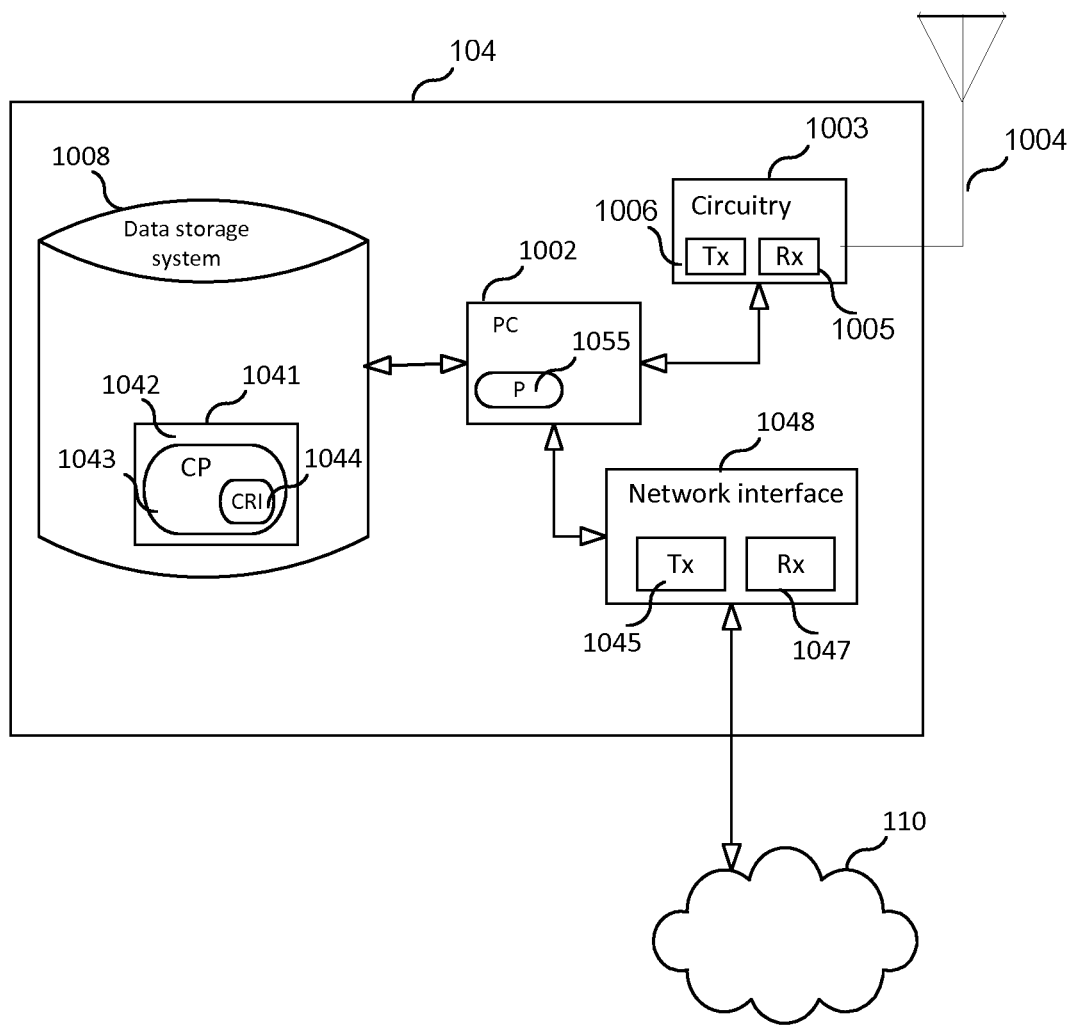
FIG. 10 is a block diagram of a server node according to one embodiment.

FIG. 10 is a block diagram of the server node 104 according to some embodiments. As shown in FIG. 10, the server node 104 may comprise: a processing circuit (PC) 1002, which may include one or more processors (P) 1055 (e.g., a general purpose microprocessor and/or one or more other processors, such as an application specific integrated circuit (ASIC), field-programmable gate arrays (FPGAs), and the like); a network interface 1048 comprising a transmitter (Tx) 1045 and a receiver (Rx) 1047 for enabling the server node 104 to transmit data to and receive data from other nodes connected to a network 110 (e.g., an Internet Protocol (IP) network) to which network interface 1048 is connected; circuitry 1003 (e.g., radio transceiver circuitry comprising an Rx 1005 and a Tx 1006) coupled to an antenna system 1004 for wireless communication with UEs); and local storage unit (a.k.a., "data storage system") 1008, which may include one or more non-volatile storage devices and/or one or more volatile storage devices (e.g., random access memory (RAM)). In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, but not limited, to magnetic media (e.g., a hard disk), optical media, memory devices (e.g., random access memory, flash memory), and the like. In some embodiments, the CRI 1044 of computer program 1043 is configured such that when executed by PC 1002, the CRI causes the server node 104 to perform steps described herein (e.g., steps described herein with reference to the flow charts and/or message flow diagrams). In other embodiments, the server node 104 may be configured to perform steps described herein without the need for code. That is, for example, PC 1002 may consist merely of one or more ASICS. Hence, the features of the embodiments described herein may be implemented in hardware and/or software.

Figure 11:
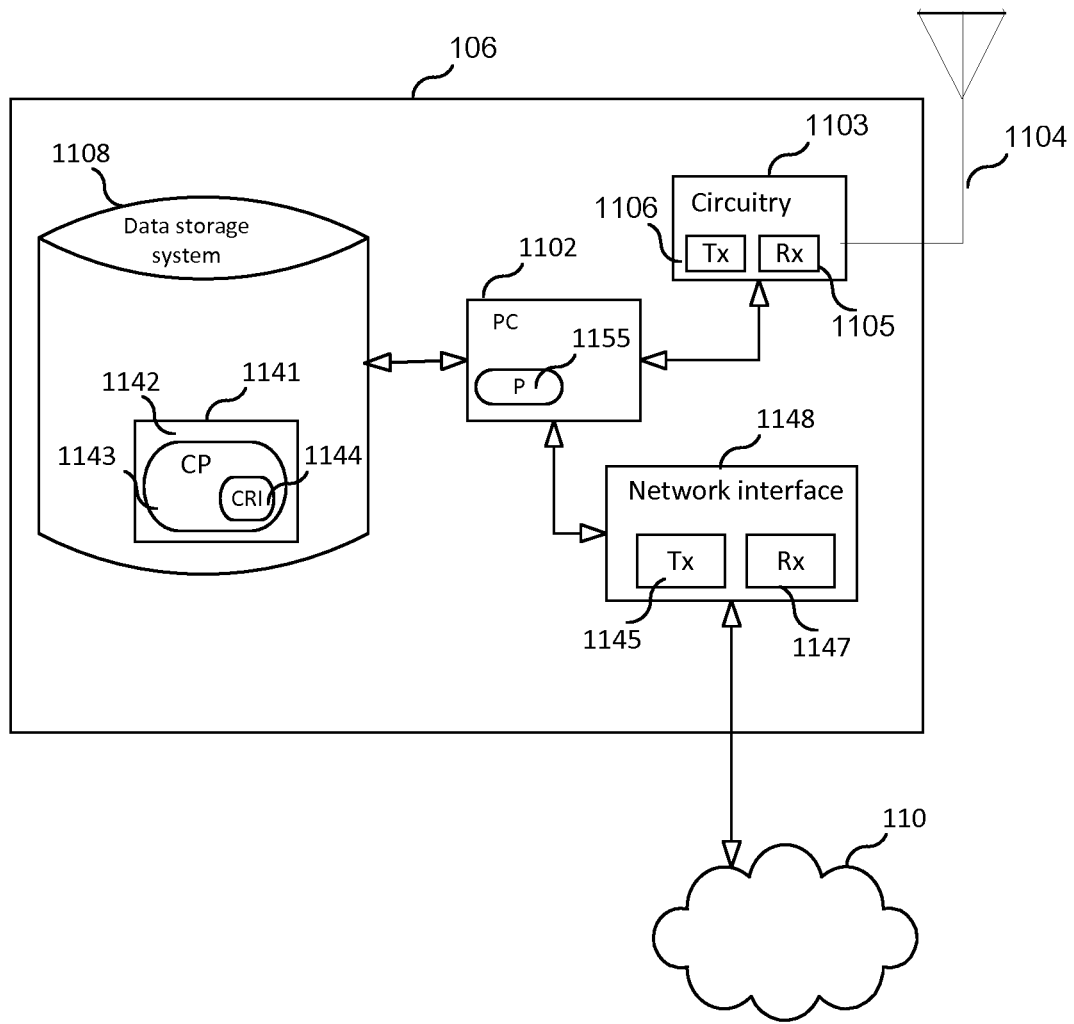
FIG. 11 is a block diagram of a registration directory node according to one embodiment.

FIG. 11 is a block diagram of the resource directory node 106 according to some embodiments. As shown in FIG. 11, the resource directory node 106 may comprise: a processing circuit (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the resource directory node 106 to transmit data to and receive data from other nodes connected to a network 110 (e.g., an Internet Protocol (IP) network) to which network interface 1148 is connected; circuitry 1103 (e.g., radio transceiver circuitry comprising an Rx 1105 and a Tx 1106) coupled to an antenna system 1104 for wireless communication with UEs); and local storage unit (a.k.a., "data storage system") 1108, which may include one or more non-volatile storage devices and/or one or more volatile storage devices (e.g., random access memory (RAM)). In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited, to magnetic media (e.g., a hard disk), optical media, memory devices (e.g., random access memory, flash memory), and the like. In some embodiments, the CRI 1144 of computer program 1143 is configured such that when executed by PC 1102, the CRI causes the resource directory node 106 to perform steps described herein (e.g., steps described herein with reference to the flow charts and/or message flow diagrams). In other embodiments, the resource directory node 106 may be configured to perform steps described herein without the need for code. That is, for example, PC 1102 may consist merely of one or more ASICs. Hence, the features of the embodiments described herein may be implemented in hardware and/or software.

Figure 12:
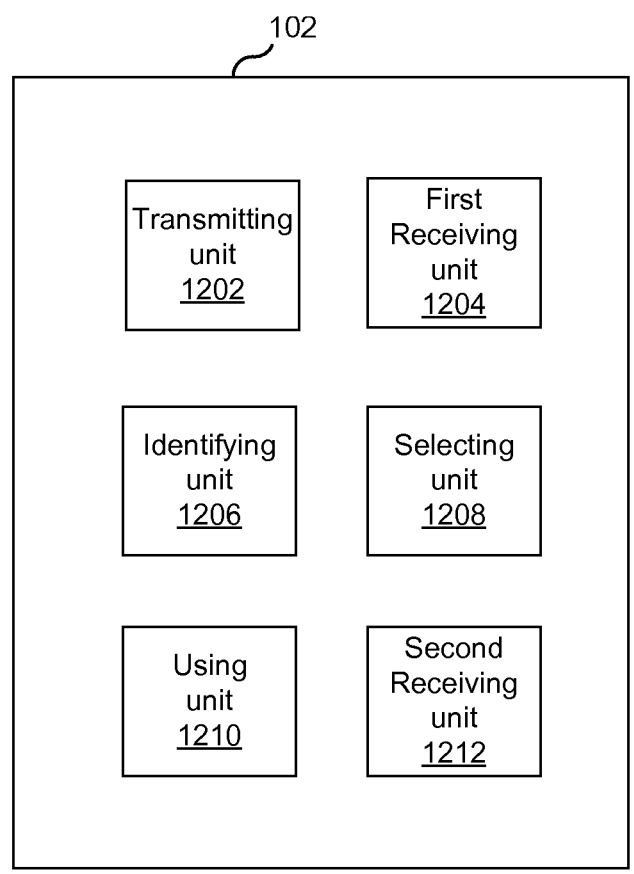
FIG. 12 is a diagram showing functional units of a client node according to one embodiment.

FIG. 12 is a diagram showing functional units of the client node 102 according to some embodiments. As shown in FIG. 12, the client node 102 includes a transmitting unit 1202 for transmitting a first request; a first receiving unit 1204 for receiving a response to the first request, wherein the response to the first request comprises information indicating a set of communication protocols supported by a server; an identifying unit 1206 for identifying the set of communication protocols from the received information; a selecting unit 1208 for selecting a communication protocol from the identified set of communication protocols; a using unit 1210 for using the selected protocol to transmit a second request to the server; and a second receiving unit 1212 for receiving a response transmitted by the server in response to the second request.

Figure 13:
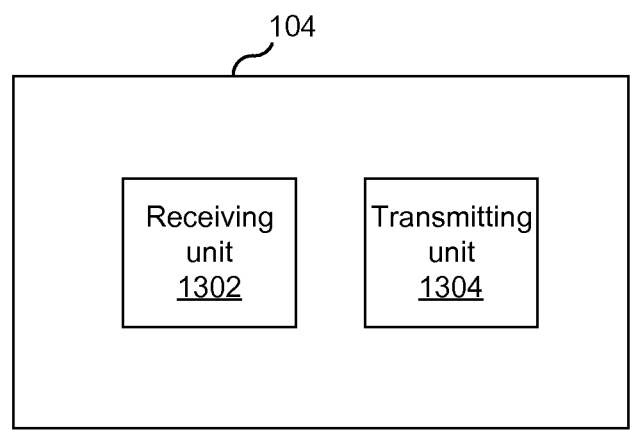
FIG. 13 is a diagram showing functional units of a server node according to one embodiment.

FIG. 13 is a diagram showing functional units of the server node 104 according to some embodiments. As shown in FIG. 13, the server node 104 includes a receiving unit 1302 for receiving a first request transmitted by a client node, the first request comprising a target resource identifier identifying a target resource and requesting a representation of the identified target resource; and a transmitting unit 1304 for transmitting to the client node a response to the first request, the response comprising a representation of the identified target resource and information indicating a set of communication protocols supported by the server node.

In some embodiments, the server node 104 includes the transmitting unit 1304 for transmitting a resource registration to a resource directory node, the resource registration request comprising a resource identifier, a resource locator associated with the resource identifier, and information indicating a set of communication protocols supported by the server node; and the receiving unit 1302 for receiving a request transmitted by a client node using a communication protocol selected from the set of communication protocols supported by the server node, wherein the request is a CoAP request message comprising a target resource identifier identifying a target resource.

Figure 14:
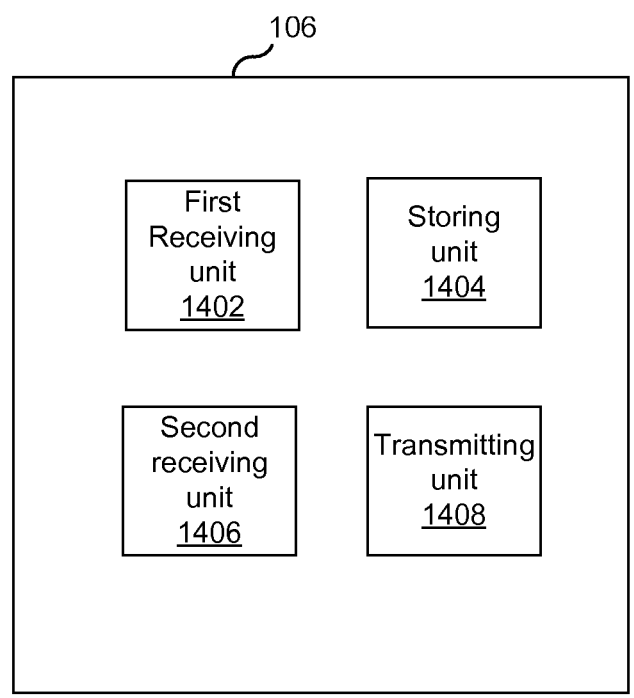
FIG. 14 is a diagram showing functional units of a registration directory node according to one embodiment.

FIG. 14 is a diagram showing functional units of the resource directory node 106 according to some embodiments. As shown in FIG. 14, the resource directory node 106 includes a first receiving unit 1402 for receiving a resource registration request transmitted by a server node, the resource registration request comprising a resource identifier, a resource locator associated with the resource identifier, and information indicating a set of communication protocols supported by the server node; a storing unit 1404 for storing the resource identifier, the resource locator associated with the resource identifier, and the information indicating the set of communication protocols; a second receiving unit 1406 for receiving a resource locator request transmitted by a client node, the resource locator request comprising the resource identifier and requesting the resource locator associated with the resource identifier; and a transmitting unit 1408 for transmitting to the client node, in response to receiving the resource locator request, a response comprising the resource locator associated with the resource identifier, and the information indicating the set of communication protocols.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a client node, the method comprising:

transmitting to a resource directory (RD) a first request for information associated with a resource of a resource type that is identified by a resource type parameter included in the first request for information;

receiving a response to the first request, wherein the response to the first request comprises a header comprising a response code indicating that the response further comprises a payload, wherein the payload of the response comprises: i) a uniform resource locator (URL) for a first resource accessible via a server, the URL comprising a scheme identifier identifying a protocol used for accessing the first resource, a server identifier identifying a server, and a port identifier identifying a port, and ii) information indicating a set of two or more transport protocols that are supported by the server and that can be used for communicating with the server using the URL for the first resource, wherein the information comprises a single name-value pair comprising a name paired with a value comprising a set of two or more identifiers, the name specifies that each said two or more identifiers is a transport protocol identifier, and said two or more transport protocol identifiers comprise a first transport protocol identifier that identifies a first transport protocol and a second transport protocol identifier that identifies a second transport protocol, wherein the information indicating the set of two or more transport protocols that are supported by the server and that can be used for communicating with the server using the URL for the first resource is separate from the URL;
selecting the first transport protocol from the first and second transport protocols;
using the selected first transport protocol to transmit a second request to the server identified in the payload of the response; and
receiving a response transmitted by the server in response to the second request.

2. The method of claim 1, wherein
the first request is a Constrained Application Protocol (CoAP) request message, and
the response to the first request is a CoAP response message.

3. The method of claim 1, wherein said two or more identifiers are listed in order of preference.

4. A method performed by a resource directory (RD) node, the method comprising:
receiving a resource registration request transmitted by a server node, the resource registration request comprising 1) a header comprising i) a method identifier identifying a method and ii) resource identifier comprising a) an RD registration resource identifier and b) a query string comprising information indicating a set of two or more transport protocols supported by the server node and 2) a payload comprising at least a first resource to be added to an RD;
receiving a request for information associated with the first resource, wherein the request for information was transmitted by a client node; and
in response to receiving the request for the information associated with the first resource, transmitting to the client node a response comprising a header comprising a response code indicating that the response further comprises a payload, wherein the payload of the response comprises a) a uniform resource locator (URL) for the first resource accessible via the server node, the URL comprising a scheme identifier identifying a protocol used for accessing the first resource, a server identifier identifying the server node, and a port identifier identifying a port and b) the information indicating the set of two or more transport protocols that are supported by the server node and that can be used for communicating with the server node using the URL for the first resource, wherein
the information comprises a single name-value pair comprising a name paired with a value comprising a set of two or more identifiers, the name specifies that each said two or more identifiers is a transport protocol identifier, and said two or more transport protocol identifiers comprise a first transport protocol identifier that identifies a first transport protocol and a second transport protocol identifier that identifies a second transport protocol, and the information indicating the set of two or more transport protocols that are supported by the server and that can be used for communicating with the server using the URL for the first resource is separate from the URL.

5. A client node comprising:
memory; and
processing circuitry, wherein the client node is configured to:
transmit to a resource directory (RD) a first request for information associated with a resource of a resource type that is identified by a resource type (rt) parameter included in the first request for information;
receive a response to the first request, wherein the response to the first request comprises a header comprising a response code indicating that the response further comprise a payload, wherein the payload of the response comprises: i) a uniform resource locator (URL) for a first resource accessible via a server, the URL comprising a scheme identifier identifying a protocol used for accessing the first resource, a server identifier identifying a server, and a port identifier identifying a port, and ii) information indicating a set of two or more transport protocols that are supported by the server and that can be used for communicating with the server using the URL for the first resource, wherein the information comprises a single name-value pair comprising a name paired with a value comprising a set of two more identifiers, the name specifies that each said two or more identifiers is a transport protocol identifier, and said two or more transport identifiers comprise a first transport protocol identifier that identifies a first transport protocol and a second transport protocol identifier that identifies a second transport protocol, wherein the information indicating the set of two or more transport protocols that are supported by the server and that can be used for communicating with the server using the URL for the first resource is separate from the URL;
select the first transport protocol from the first and second transport protocols;
use the selected first transport protocol to transmit a second request to the server identified in the payload of the response; and
receive a response transmitted by the server in response to the second request.

6. The client node of claim 5, wherein
the first request is a Constrained Application Protocol (CoAP) request message, and
the response to the first request is a CoAP response message.

7. A computer program product comprising a non-transitory computer readable medium storing a computer program comprising instructions which, when executed by processing circuitry, causes the processing circuitry to carry out the method of claim 1.

8. The method of claim 1, wherein the first transport protocol is any one of user datagram protocol (UDP), a combination of UDP and datagram transport layer security (DTLS), transmission control protocol (TCP), a combination of TCP and transport layer security (TLS), WebSocket, a combination of WebSocket and TLS, and quick UDP internet connections (QUIC).

9. The method of claim 1, wherein the value does not contain a resource identifier.

10. The method of claim 4, wherein
the value does not contain a resource identifier.

11. The client node of claim 5, wherein the value does not contain a resource identifier.

12. A resource directory (RD) node comprising:
memory; and
processing circuitry, wherein the RD node is configured to:
receive a resource registration request transmitted by a server node, the resource registration request comprising 1) a header comprising i) a method identifier identifying a method and ii) resource identifier comprising a) an RD registration resource identifier and b) a query string comprising information indicating a set of two or more transport protocols supported by the server node and 2) a payload comprising at least a first resource to be added to an RD;
receive a request for information associated with the first resource, wherein the request for information was transmitted by a client node; and
in response to receiving the request for the information associated with the first resource, transmit to the client node a response comprising a header comprising a response code indicating that the response further comprises a payload, wherein the payload of the response comprises a) a uniform resource locator (URL) for the first resource accessible via the server node, the URL comprising a scheme identifier identifying a protocol used for accessing the first resource, a server identifier identifying the server node, and a port identifier identifying a port and b) the information indicating the set of two or more transport protocols that are supported by the server node and that can be used for communicating with the server node using the URL for the first resource, wherein
the information comprises a single name-value pair comprising a name paired with a value comprising a set of two or more identifiers, the name specifies that each said two or more identifiers is a transport protocol identifier, and said two or more transport protocol identifiers comprise a first transport protocol identifier that identifies a first transport protocol and a second transport protocol identifier that identifies a second transport protocol, and
the information indicating the set of two or more transport protocols that are supported by the server and that can be used for communicating with the server using the URL for the first resource is separate from the URL.

13. The RD node of claim 12, wherein the value does not contain a resource identifier.

* * * * *